United States Patent Office 3,446,762
Patented May 27, 1969

3,446,762
EPOXY RESIN TRAFFIC PAINT COMPOSITIONS
John A. Lopez, Springfield, and James R. Hallstrom, Fanwood, N.J., assignors to Shell Oil Company, New York, N.Y., a corporation of Delaware
No Drawing. Filed Sept. 24, 1965, Ser. No. 490,064
Int. Cl. C09d 3/58
U.S. Cl. 260—18        6 Claims

ABSTRACT OF THE DISCLOSURE

Rapid-dry, one-package, epoxy traffic paint compositions requiring no curing agent comprises (1) an organic solvent, (2) a pigment and (3) a condensation product having the general formula $A(BA)_mB$ wherein A is a glycidyl polyether of a polyhydric phenol radical and B is a dimer of unsaturated fatty acids containing at least 12 carbon atoms or a saturated dicarboxylic acid, and $m$ is an integer from 0 to 30, said glycidyl polyether and acids being reacted in an approximately equal mole ratio (1.25:1.0 to 1.0:1.25).

---

This invention relates to rapid-dry coating compositions of outstanding durability. More particularly, the invention relates to film-forming compositions which are suitable for forming a traffic marker upon a traffic surface, such as a highway or pedestrian walk.

Specifically, the invention provides one-package, rapid-drying traffic paint compositions which retain their toughness and abrasion resistance over extended periods of time during exposure to weather and traffic. The term "one-package" as used herein means that the compositions of this invention require no further additives, such as curing agents, hardeners, etc.

There is a growing need for highway or traffic paints which will dry rapidly, not age-harden, crack, and peel off. Traffic paints which have good adhesion, i.e., will not be picked up by traffic, and which have good durability are also needed. Conventional traffic paints now in use are based on drying oil alkyds. The drying oil alkyd resins used in alkyd resin based paints are an oxidizing alkyd comprising, for example, phthalic anhydride and glycerin modified with a drying oil. The drying oil alkyd based paints to which a solvent, such as naphtha or white spirits, has been added are applied to highway surfaces as a liquid. The solvent is released by evaporation and subsequently the unsaturated fatty acid chains of the resin molecule readily absorbs oxygen from the air and dry the resin to form a tough film. Thus, the drying rate in the drying oil alkyd resins is a function of oxidative polymerization, as well as solvent release. The oxidation, however, continues and the film becomes progressively harder resulting in embrittlement and reduction of abrasive resistance thereof causing the film to crack and peel off.

Accordingly, it is an object of this invention to provide rapid-drying one-package traffic paint compositions which have food adhesion, do not age-harden, are not picked up by traffic and which retain their toughness and abrasive resistance and which have outstanding durability, i.e., wearing and weathering resistance. These and other objects and advantages of the invention will be apparent from the following description and disclosure thereof.

It has now been found that these and other objectives and advantages are accomplished by the paint compositions of the present invention which comprise the following components:

(1) A condensation product comprising near equal molar ratios of a glycidyl polyether of a polyhydric alcohol and a dimer acid;
(2) Solvent; and
(3) Pigment.

The paint compositions of the present invention which are one-package systems, i.e., the compositions are applied without the addition thereto of further materials, such as curing agents are particularly suitable for traffic paint applications. Heretofore, it was believed necessary in formulating traffic paint compositions to employ resins modified with drying oils in order to obtain a hard dry coating which would not be picked up by traffic and stick to tires. The paint compositions of the present invention, however, do not employ drying oils. The paint compositions of the present invention are applied to the highway surface, and the solvent then evaporates leaving a tough film on the highway surface which is not picked up by traffic. These paint compositions contain little unsaturation and essentially dry by solvent evaporation. Accordingly, the initial molecular structure of the resin compositions of the present invention remain substantially unchanged after all the solvent is released, whereas drying oil alkyd compositions continue to age-harden according to the customary mechanism of oxidative polymerization and become brittle.

THE CONDENSATION PRODUCT COMPONENT

The condensation product component of the compositions of the present invention are polymers obtained by reacting a diepoxide and a dimer acid in nearly equal molar proportions. The resulting polymers can conveniently be represented by the formula $A(BA)_mB$, where A the diepoxide radical, B is the dimer acid radical and where $m$ is an integer of the series 0, 1, 2, 3 . . . etc., e.g. as high as 10, 20, 30 or even higher. While $m$ for any single molecule will be an integer, the fact that the condensation product is a mixture of compounds causes the determined value of $m$, e.g., from molecular weight measurement, to be an average which is not necessarily zero or a whole number. Preferably $m$ is a value from 3 to 9. The terminal groups can be epoxide or acid or mixtures of each.

The diepoxide reactant of the condensation product, represented by A in the above formula, comprise those organic materials which contain terminal vic-epoxy groups. Preferably these materials are aromatic polyethers which are obtainable by reacting a polyhydric phenol with epichlorohydrin or dichlorohydrin and sufficient alkali to combine with the released hydrogen chloride. The polyethers of a dihydric phenol are particularly preferred. These polyethers have a chemical structure wherein the glyceryl radicals from the epichlorohydrin or dichlorohydrin and the divalent aromatic hydrocarbon radicals from the dihydric phenol are present as a chain with the two types of radicals alternating and being joined into the chain by ethereal oxygen atoms. The terminal groups of the chain in the polyethers may contain 1,2-epoxy groups due to the presence of a glycidyl radical thereat although some of the terminal groups may be dihydroxylglycerol radicals resulting from hydration of the glycidyl radical.

The 1,2-epoxy equivalency of the glycidyl polyethers of a polyhydric phenol employed in the ester component is a value greater than 1.0, the 1,2-epoxy equivalency being the number of epoxy groups

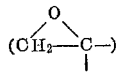

contained in the average molecule of the polyether. In the case of glycidyl polyethers of a dihydric phenol, the 1,2-epoxy equivalency is normally between 1.2 and 2.0.

The simplest of the polyethers are diglycidyl diethers of dihydric phenols which contain a single divalent aromatic hydrocarbon radical from the dihydric phenol and have two glycidyl radicals linked thereto by ethereal oxygen atoms. More generally, the polyether is of resinous character and contains two or more aromatic hydrocarbon radicals alternating with glyceryl groups which are connected therewith through ether oxygen atoms. Ordinarily, the polyether is a complex mixture of compounds rather than being a single particular compound. The principal product may be represented by the formula

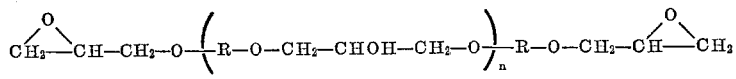

wherein $n$ is an integer of the series 0, 1, 2, 3 . . ., and R represents the divalent hydrocarbon radical of the dihydric phenol. While for any single molecule, $n$ will be an integer, the fact that the polyether is a mixture of compounds causes the determined value of $n$, e.g., from molecular weight measurement, to be an average which is not necessarily zero or a whole number. Although the polyether is a substance primarily of the above formula, it may contain some material with one or both of the terminal glycidyl radicals in hydrated form. Additionally, modified diepoxides, such as methylolated epoxy resins, may be used to prepare suitable condensation product components for use in the compositions of the present invention.

Any of the various dihydric phenols is used in preparing the esterifiable polyethers, including mononuclear phenols such as resorcinol, catechol, hydroquinone, methyl resorcinol, etc.; or polynuclear phenols like 2,2-bis(4-hydroxyphenyl)propane, i.e., (bis-phenol), 4,4'-dihydroxybenzophenone, bis(4-hydroxyphenyl)methane, 1,1-bis(4 - hydroxyphenyl)ethane, 1,1 - bis(4 - hydroxyphenyl)isobutane, 2,2 - bis(4 - hydroxyphenyl)butane, 2,2 - bis(4 - hydroxy-2-methylphenyl)propane, 2,2-bis(4-hydroxy - 2 - tertiarybutylphenyl)propane, 2,2-bis(2-hydroxynaphthyl)pentane, 1,5-dihydroxynaphthalene, etc.

More specifically, the polyethers are prepared, in general, by heating at about 50° C. to 200° C. the dihydric phenol with epichlorohydrin in a basic reaction medium. Depending upon the type of product desired, there is used from more than 1 to 2 or more moles of epichlorohydrin per mol of dihydric phenol. Also present is a base, such as sodium hydroxide, generally in amount of about 5% to 30% stoichiometric excess of the epichlorohydrin, i.e., 1.05 to 1.3 equivalents of base per mol of epichlorohydrin. In effecting the reaction, the dihydric phenol is mixed with an aqueous solution of the base and heated. The epichlorohydrin is then added rapidly to the stirred reaction mass. The initial reaction is somewhat exothermic so that a temperature rise occurs to some extent. After addition of the epichlorohydrin, heating is applied for several hours while stirring in order to complete the reaction. While still in molten state, the formed polyether is washed with water until free of base, and then heated to remove water.

The preparation of some of the glycidyl polyethers of dihydric phenols will be illustrated below.

Polyether A.—About 2 mols of bis-phenol was dissolved in 10 mols of epichlorohydrin and 1 to 2% water added to the remaining mixture. The mixture was then brought to 80° C. and 4 mols of solid sodium hydroxide added in small portions over a period of about 1 hour. During the addition, the temperature of the mixture was held to about 90° C. to 110° C. After the sodium hydroxide had been added, the water formed in the reaction and most of the epichlorohydrin was distilled off. The residue that remained was combined with an approximately equal amount of benzene and the mixture filtered to remove the salt. The benzene was then removed to yield a viscous liquid having a viscosity of about 150 poises at 25° C. and a molecular weight of about 350 (measured ebullioscopically in ethylene dichloride). The product had an epoxy value of 0.50 eq./100 g., and an epoxy equivalency of 1.75. For convenience, this product will be referred to hereinafter as polyether A.

Polyether B.—A solution consisting of 11.7 parts of water, 1.22 parts of sodium hydroxide and 13.38 parts of bis-phenol was prepared by heating the mixture of ingredients to 70° C. and then cooling to 46° C. at which temperature 14.06 parts of epichlorohydrin was added while agitating the mixture. After 25 minutes had elapsed, there was added during an additional 15 minutes time a solution consisting of 5.62 parts of sodium hydroxide in 11.7 parts of water. This caused the temperature to rise to 63° C. Washing with water at 20° C. to 30° C. temperature was started 30 minutes later and continued for 4½ hours. The product was dried by heating to a final temperature of 140° C. in 80 minutes and cooled rapidly. At room temperature, the product was an extremely viscous semi-solid having a melting point of 27° C. by Durran's Mercury method and a molecular weight of 483. The product had an epoxy value of 0.40 eq./100 g., and an epoxy equivalency of 1.9. For convenience, this product will be referred to as polyether B.

Polyether C.—About 228 parts of bis-phenol and 84 parts sodium hydroxide as a 10% aqueous solution were combined and heated to about 45° C. whereupon 176 parts of epichlorohydrin was added rapidly. The temperature increased and remained at about 95° C. for 80 minutes. The mixture separated into a two-phase system and the aqueous layer is drawn off. The resinous layer that remained is washed with hot water and then drained and dried at 130° C. The Durran's mercury method melting point of the resulting product is 40–45° C. and the molecular weight is about 710. The product has an epoxy value of .345–.298 eq./100 g. and an epoxy equivalency of 1.9. For convenience, this product will be referred to as polyether C.

Polyether D.—Into a reaction vessel fitted with a stirrer, 1 mol of 2,2-bis(4-hydroxyphenyl)propane, referred to as (bis-phenol), and 1.88 mols of sodium hydroxide as a 10% aqueous solution are introduced and heated to about 45° C. whereupon 1.57 mols of epichlorohydrin are added rapidly while agitating the mixture. The temperature is then adjusted so that the mixture is heated at about 100° C. to 105° C. for about 80 minutes. The mixture separates into a two-phase system and the aqueous layer is decanted. The product is then washed with hot water until neutral to litmus whereupon the resulting polyether is drained and dehydrated by heating at about 150° C.

The polyether has a softening point of about 71° C. (Durran's mercury method). The molecular weight is 900 measured ebullioscopically in ethylene dichloride (average $n=2$). The equivalent weight of esterification is 145, which value is the grams of polyether that will esterify and combine completely with one gram molecule of fatty acid. This value is obtained by heating a sample of the polyether with about twice the theoretical amount of higher fatty acid necessary to react with all of the hydroxyl and epoxy groups, the higher fatty acid being Armour's Neofat No. 3 consisting of about 50% linoleic acid, 40% oleic acid, and 10% stearic acid. The heating is effected at about 230° C. until a constant acid value is obtained. This may require 10 hours heating. By back titrating the unreacted fatty acid with base, a measure is obtained from which the equivalent weight to esterification is calculated. The polyether also has an epoxide equivalent of from about 425 to 550 which is the grams of resin containing one gram-equivalent of epoxide, an epoxy value of about .235 to .181 equivalent per 100 grams and a hydroxyl value of 0.28 equivalent per 100 grams of resin. The 1,2-epoxy equivalency is, therefore, 1.8.

Polyether E.—This glycidyl polyether of higher molecular weight is prepared in a like manner to that of polyether A except that for each mole of bis-phenol there is employed 1.22 moles of epichlorohydrin and 1.37 moles of sodium hydroxide. The resulting product has a melting point of 90° C., a molecular weight of 1400 and an epoxide equivalent of from 872 to 1025.

In like manner, other polyethers of bis-phenol or of other dihydric phenols may be prepared which will have different molecular weights and values for $n$ depending upon the molar ratio of epichlorohydrin to dihydric phenol used in preparation thereof.

Particularly preferred members of the above-described group are the glycidyl polyethers of the dihydric phenols, and especially 2,2-bis(4-hydroxyphenyl)propane, having an epoxy equivalency between 1.1 and 2.0 and a molecular weight between 300 and 900. Particularly preferred are those having a Durran's mercury method softening point below about 60° C.

The still higher molecular weight polyethers are obtainable by reacting polyether E with an additional quantity of dihydric phenol. For example, a polyether having a softening point of about 130° C., a molecular weight of about 2900 and an equivalent weight to esterfication of 190 is obtained by reacting polyether B with an added 5% of bis-phenol. This reaction is effected by heating the polyether to 150° C., and then adding the bis-phenol. The heating is continued for about two hours while stirring the reaction mass and gradually increasing the temperature to about 190° C. Still another polyether is prepared in the same manner except polyether E is reacted with an added 7.75% of bis-phenol. This polyether has a softening point of about 156° C. and an average molecular weight of about 3750.

The dimer acid reactant of the condensation product, represented by B in the above formula, comprise acids obtained by polymerizing unsaturated fatty acids, such as soya bean oil fatty acids and the like. Particularly preferred are the dimerized acids obtained from the ethylenically unsaturated fatty acids or mixtures thereof derived from semi-drying and drying oils, and particularly the conjugated fatty acids containing at least 12 and generally from about 12 to about 20 carbon atoms, such as 9,11-octadecadienoic acid and other acids within the generic formula

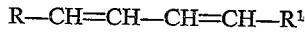

wherein R is a —R²COOH radical, R¹ is either a —R²COOH group or an alkyl radical and R² is an alkyl radical. These acids polymerize to form dimer acids of the general formula

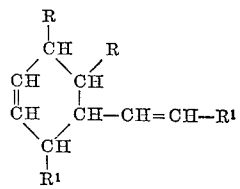

Other suitable dimer acids include those obtained from linoleic acid, linolenic acid, eleosteric acid, ricinoleic and acid. Still another group of dimers are those obtaned from dibasic acids such as 8,12-eicosadiene-1,20-dioic acid, 8- vinyl-10-octadecene-1,18-dioic acid, 7,11-octadecadiene-1,18-dioic acid, and the like. Dimer acids are available commercially sold under various trade names. A suitable such acid includes Empol 1014, a viscous aliphatic polybasic acid produced by the polymerization of unsaturated fatty acids at mid-molecule and containing 1% $C_{18}$ monobasic fatty acid, 95% $C_{36}$ dibasic fatty acid, and 4% $C_{54}$ tribasic fatty acid, acid value 188–193, saponification value 194–198 and neutralization equivalent 292–298.

The polymerization may be effected by utilizing the lower aliphatic esters of the unsaturated acids so as to prevent dicarboxylation during the heating period, and converting the ester groups to carboxyl groups through hydrolysis. This process is illustrated in the Industrial and Engineering Chemistry, page 89, volume 33 (1941) and page 1139, volume 38 (1946).

According to a modified embodiment of the present invention a saturated normal aliphatic dicarboxylic acid is used instead of a dimer acid in preparing the condensation product. Preferred saturated acids include acids having 6 to 10 carbon atoms in their molecule, such as adipic, suberic, azelaic and sebacic acids, although the higher molecular weight acids are also suitable.

The amount of the reactants and catalyst to be employed are critical. It has been found that diepoxides and dimer acids when reacted in near equal molar ratios and in the presence of triphenylphosphine (catalyst) yield very high molecular weight polymers. These linear, thermoplastic polymers containing hydroxyl groups throughout their length are composed of alternating diepoxide and acid blocks joined by acyloxy groups. At a mole ratio of 1 to 1, diepoxide to acid, the highest molecular weight polymers are formed. Suitable polymers are also obtained in the presence of triphenylphosphine if the mole ratio of reactants is within the ranges of 1.5:1 to 1:1.5 and preferably 1.25:1 to 1:1.25.

The triphenylphosphine catalyst is preferably used in amounts varying from about 0.05% to 3% by weight of reactants.

Temperatures employed in the reaction will generally vary from about 50° C. to about 150° C. In most cases, the acidic component and the polyepoxide will be quite reactive and temperatures of the order of about 50° C. to 125° C. will be sufficient to effect the desired reaction. In other instances, it may be desirable to use higher temperatures, such as those from 125° C. to 275° C. Temperatures of 300° C. or over should generally not be employed.

The reaction is preferably conducted under atmospheric pressure, but it may be advantageous in some cases to employ subatmospheric or superatmospheric pressures.

The reaction may be conducted in the presence or absence of solvents or diluents. In most cases, the acidic component and polyepoxide will be liquid and the reaction may be easily effected without the addition of solvents or diluents. However, in some cases, whether either or both reactants are solids or viscous liquids it may be desirable to add diluents to assist in effecting the reaction, such as, for example, inert hydrocarbons as xylene, toluene, cyclohexane, and other materials as cyclohexanone, and the like.

If solvents are employed in the reaction and the formed condensate is to be used for coating compositions, the solvent may be retained with the condensate. Otherwise, the solvent should be removed by any suitable method such as vacuum distillation and the like. If the condensate is not to be utilized for some time after its formation, it may also be desirable to remove the catalyst used in the preparation. This may be accomplished by neutralization, stripping, or the like.

The condensate component may be prepared, for example, by heating in a closed kettle under an atmosphere of nitrogen at temperature ranging from 120° to 225° C., a diepoxide and an acid reactant in a molar ratio of from about 1:1.25 to 1.25:1 with constant stirring. The resulting polymer may then be dissolved in a solvent such as toluene to form a solution of desired solid content, e.g., 60% solids.

THE SOLVENT COMPONENT

A suitable solvent component of the traffic paint composition of the present invention includes ketones, such as acetone and methyl ethyl ketone, alcohols, glycol ethers, toluene, xylene, benzene, mineral spirits, naphthas and other aromatic petroleum distillates. The solvent component may consist of a mixture of two or more of the above compounds. The ratio of solvent to resin component may be varied widely depending upon the chosen method of applying the traffic paint to the highway surface, i.e., spraying, brushing, rolling, etc. Spraying is the usual method of applying the traffic paint to the highway surface. The concentration in this instance is usually a volume ratio of about 50:50, but in some situations may vary from 70:30 to 30:70, solvent to condensation product.

PIGMENT COMPONENT

The third and final component of the paint compositions of the present invention is the pigment. The pigment component usually contains a mixture of pigments. Any of the standard pigments which are used in conventional traffic paints are suitable for use in the paint compositions of this invention. Such pigments include, for example: 100% titanium dioxide; 30% titanium dioxide—70% calcium sulfate mixture; a mixture of calcium carbonate and magnesium carbonate; diatomaceous silicas, treated and untreated clays, calcium sulfate, zinc oxide, mica, magnesium silicate and titanium calcium among others. The concentration of the pigment in the paint compositions, expressed as percent pigment volume concentration, varies from about 40:60 to 60:40 and preferably from 45:55. The term "percent pigment volume concentration" has reference to that volume portion of the paint, excluding the solvent which is pigment, e.g., a composition comprising ⅓ resin, ⅓ solvent and ⅓ pigment by volume would have a percent pigment volume concentration of 50.

In terms of the total paint composition the concentration of the condensation product component may range from about 10% to 30% by volume, the cencentration of the solvent components may range from about 40% to 80% by volume and the concentration of the pigment component may range from about 10% to 30% by volume, the sum of the three components totaling 100%.

The pigment is added to the solvent-resin composition known more commonly as vehicle and blended therewith to obtain a homogeneous paint composition. Any suitable means of blending may be employed. The resulting traffic paint composition is applied to the highway surface, for example by spraying. The solvent evaporates from the composition leaving a tough film on the surface which has excellent wear and weather resistances.

The traffic paint compositions of the present invention are one-package systems and may be applied to highway surfaces by techniques presently employed in applying conventional traffic paints.

The following examples illustrate the preparation and use of the present paint compositions and compares the compositions with conventional alkyd resin based traffic paints.

The following example is for purposes of illustration and is in no way intended to limit the invention to the particular compositions illustrated.

The viscosity in the following examples is expressed in poises and/or Gardner units, e.g., X, which corresponds to a given number of poises. The Gardner method of determining and expressing viscosity is well-known in the paint and varnish technology. A more complete explanation thereof is given in the book by Henry A. Gardner et al. entitled "Physical and Chemical Examination of Paints, Varnishes, Lacquers, and Colors," 12th edition (1962), distributed by Gardner Laboratory, Inc., Bethesda, Md.

Example 1

904 g. of polyether A, 1524 g. of Empol 1014, and 9 grams of triphenylphosphine (a mole ratio of 1:1.13, polyether A to acid) are charged into a 5-liter 4-neck flask equipped with a stirrer, thermometer and inert gas sparge. The flask is heated to 350° F. under a nitrogen atmosphere and allowed to exotherm. After the temperature has subsided to 350° F., the temperature is held at 350° F. for ½ hour. The linear polymer composed of alternating polyether A and dimer acid blocks having a molecular weight of approximately 3800 is dissolved in toluene to about 60% solids.

The resulting solution has the following characteristics:

| | |
|---|---|
| Solids _____percent__ | 60.6 |
| Solvent _____ | (1) |
| Viscosity _____ | $Z_4$–$Z_5$ |
| Acid No. _____ | 10.5 |
| Color _____ | +6 |
| Weight per gallon _____lbs__ | 8.05 |

[1] Toluene.

Examples 2–8

The procedure of Example 1 is repeated except the mole ratio of polyether A to dimer acid is varied, solid content of solution and solvent. The viscosity of the various solutions are tabulated below.

| | Mole ratio, Polyether: Acid | Solution | | Viscosity | |
|---|---|---|---|---|---|
| | | Solvent | Solids, percent | Gardner | Poises (approx.) |
| Example: | | | | | |
| 2 | 1.25:1 | Toluene | 63.0 | X+ | 15 |
| 3 | 1.13:1 | do | 65.0 | X | 13 |
| 4 | 1.07:1 | do | 60.0 | X | 13 |
| 5 | 1:1 | Toluene 1/Acetone 1 | 57.3 | $Z_4$–$Z_5$ | 80 |
| 6 | 1:1.07 | do | 59.9 | $Z_7$– | 390 |
| 7 | 1:1.13 | do | 61.6 | $Z_4$–$Z_5$ | 80 |
| 8 | 1:1.25 | do | 62.5 | $Z_1$–$Z_2$ | 33 |

Example 9

Traffic paint compositions are prepared from the solutions of Examples 1–8 according to the following procedure:

To the solution of the condensation product of each example which contains about 60% solids is added during constant stirring and amount of pigment consisting of titanium dioxide, magnesium silicate, calcium carbonate and diatomaceous silica to produce a composition havng a 50% pigment volume concentration. The stirring is continued for approximately 15 minutes to obtain a loose mix or premix. The premix is then processed further to obtain complete pigment dispersion within the condensation product-solvent or vehicle portion of the paint composition. This can be easily accomplished by milling, grinding, or high shear mixing. Satisfactory dispersion is obtained by further processing on a three roll mill which effects complete breakdown of the pigment agglomerates and thoroughly mixes the composition. The resulting homogeneous paint compositions have a white color.

Example 10

The traffic paint composition prepared from the solution of Example 1 according to the procedure of Example 9 and state specification traffic paints which are presently used were tested on U.S. Route 40—concrete lanetraverse traffic exposure—for 8½ months. At the end of this period test results showed that the film loss was only 15% and that this loss was due to erasion, i.e., abrasion. Each paint was applied to produce a film having a thickness of 15 mils. The state specification traffic paint showed a film loss of 40% which was due to chipping and scaling, i.e., loss of adhesion.

Examples 11-17

The procedure of Example 1 is repeated except that condensation products of varying molecular weight are prepared, i.e., $m$ in the formula $A(BA)_mB$ has values of from 3 to 8. The viscosities of the products in toluene, molecular weight and termination are listed below:

| Example No. | $m^1$ Value | Termination | Viscosity Gardner, 60% Toluene | Approx.[2] Molecular Weight |
|---|---|---|---|---|
| 11 | [2] 3 | Epoxy | V-W | |
| 12 | [2] 7 | do | | |
| 13 | 8 | do | $Z_4$-$Z_5$ | 7,700 |
| 14 | 6½ | Acid | $Z_4$-$Z_5$ | 6,100 |
| 15 | 4 | Epoxy | U+ | 3,800 |
| 17 | 4- | do | R+ | 3,700 |

[1] The repeating unit "m" is an approximation of the prominent molecular weight species in each sample.
[2] Calculated values.

Only a slight difference in performance has been observed between the products described in Examples 11-17 in terms of highway performance. While the compositions of the present invention provide excellent traffic paint compositions, the composition may also find utility in other areas of application where flexibilty is desirable.

The procedure of Example 1 was repeated in Examples 18-20 except that equivalent amounts of other polyethers and dimer acids were used as follows.

Example 18

Polyether B and dimerized 9,11-octadecadienoic acid.

Example 19

Polyether C and dimerized linolenic acid.

Example 20

Polyether A and dimerized 8,12-eicosadiene-1,20-dioic acid.

Example 21

The procedure of Example 1 was repeated with the exception that an equivalent amount of adipic acid was used in place of Empol 1014. The resulting composition possessed characteristics similar to those given for the solution in Example 1. Similar results were also obtained when suberic, azelaic and sebacic acids were used in place of Empol 1014.

According to one specific embodiment of the invention, unexpected results are obtained when hardeners are added to the compositions of the present invention. Since the compositions of the present invention contain little unsaturation (iodine value of 90 to 110), it would be expected that hardeners would have little or no effect thereon, especially since hardeners have no effect on comparable substances, such as cotton seed oil and castor oil (iodine values of 100 and 90, respectively) which are considered non-drying oils. It has been found, however, that the addition of hardeners to the compositions of the present invention result in traffic paint films which have improved properties which include improved properties which are not directly related to the hardness of the films. These properties include, for example, improved retention qualities, i.e., adherence of film to a surface, and the film does not pick up dirt as readily. Suitable hardeners for use with the compositions of the present invention include the metal naphthenates, such as cobalt, manganese, lead, calcium, iron and zinc naphthenates or combinations thereof.

We claim as our invention:

1. A traffic paint composition comprising from about 40 percent to 80 percent by volume of an inert organic solvent, from about 10 percent to 30 percent by volume of a pigment, and from 10 percent to 30 percent by volume of a non-drying condensation product having the general formula $A(BA)_mB$ where A represents a glycidyl polyether of a polyhydric phenol radical having a molecular weight of from about 300 to about 1000, B represents a dimer of unsaturated fatty acids having at least 12 carbon atoms or a sautrated dicarboxylic acid having at least 6 carbon atoms in its molecule, and $m$ represents a number of from 0 to 10, said condensation product being prepared by reacting said glycidyl polyether with said acids in the mole ratio of from 1.25:1 to 1:1.25 at a temperature of from about 50° C. to about 275° C.

2. A composition according to claim 1 wherein the dimer acid comprises an acid or acids derived from acids of the general formula $R-CH=CH-CH=CH-R^1$ where R is the radical $-R^2COOH$, $R^1$ is selected from R or $R^2$ and $R^2$ is an alkyl group, said acid having from 12 to 20 carbon atoms.

3. A composition according to claim 1 wherein the saturated dicarboxylic acid is adipic, suberic, azelaic or sebacic acid.

4. A composition according to claim 2 wherein said polyether is the reaction product of epichlorohydrin and 2,2-bis(4-hydroxyphenyl)propane.

5. A composition according to claim 3 wherein the polyether has an approximate molecular weight of 350.

6. A traffic paint composition consisting essentially of from about 40 percent to 80 percent by volume of an inert organic solvent, from about 10 percent to 30 percent by volume of a pigment, and from 10 percent to 30 percent by volume of a non-drying condensation product of the formula $A(BA)_mB$ wherein A represents a polyether radical having an approximate molecular weight of 350 which is the reaction product of epichlorohydrin and 2,2-bis(4-hydroxyphenyl)propane, B represents a dimerized acid derived from ethylencially unsaturated fatty acids having at least 12 carbon atoms, and $m$ is a number from 3 to 10 said condensation product being prepared by reacting at a temperature from about 50° C. to about 150° C. in the presence of from 0.05 to 3% by weight of the reactants of triphenylphosphine, said polyether being reacted with said fatty acids in the mole ratio of from about 1.25:1 to 1:1.25.

References Cited

UNITED STATES PATENTS

| | | |
|---|---|---|
| 2,970,983 | 2/1961 | Newey. |
| 3,219,602 | 11/1965 | Scheibli. |
| 3,280,056 | 10/1966 | Masters. |
| 2,698,308 | 12/1954 | Crecelius. |
| 2,733,222 | 1/1956 | Beacham. |

OTHER REFERENCES

Klarquist: Highway Research Board Proceeding, 1960, vol. 39, pp. 336–339.

Epon Resins by Shell Chem. Co., 1957, pp. 18–19.

MORRIS LIEBMAN, *Primary Examiner.*

L. T. JACOBS, *Assistant Examiner.*

U.S. Cl. X.R.

260—32.8, 33.2, 33.4, 33.6, 37